May 8, 1956 L. W. PETERSEN 2,744,570
VAPOR COLLECTING AND FLUID PREHEATING SYSTEM FOR EVAPORATORS
Filed Aug. 11, 1953 2 Sheets-Sheet 1
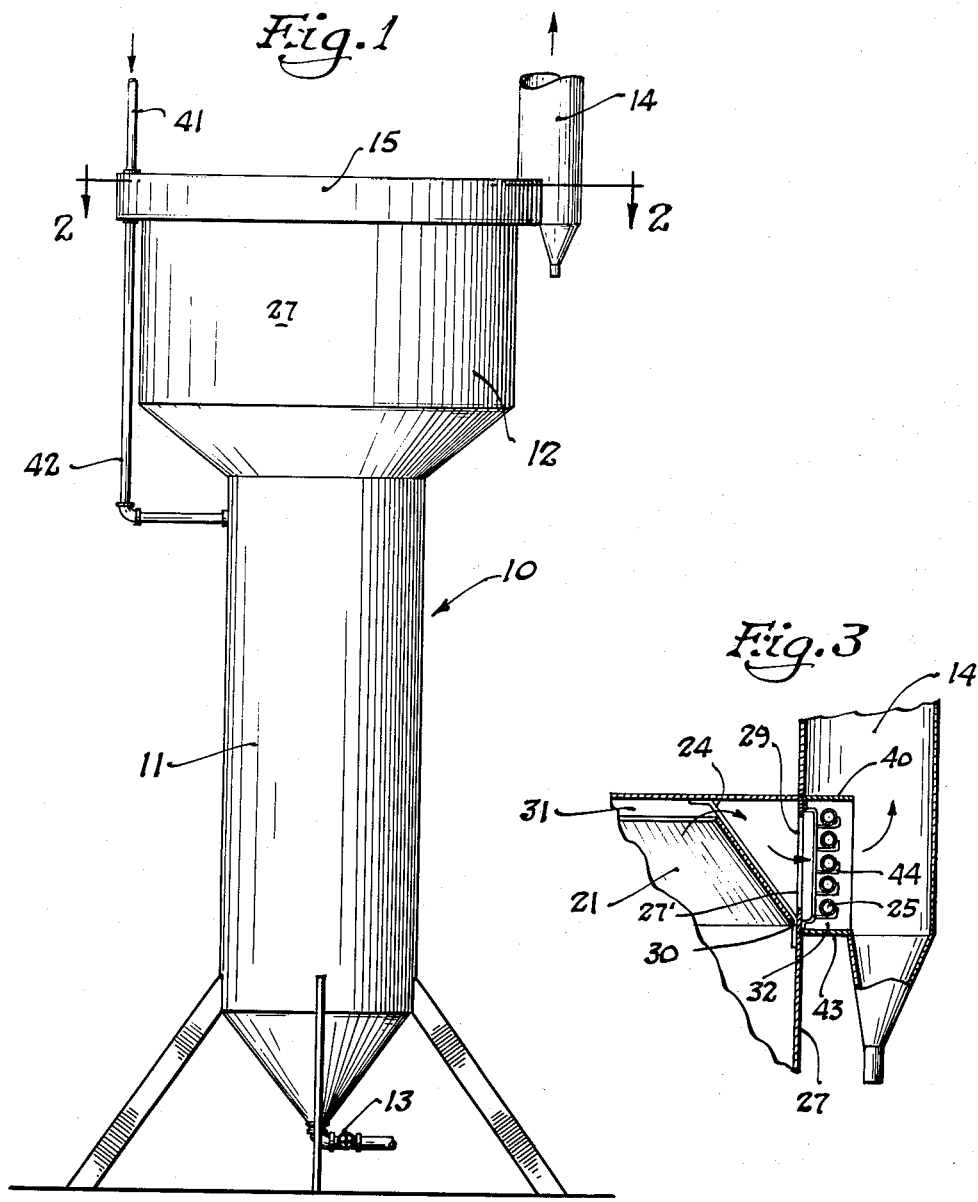
INVENTOR.
Lowell W. Petersen
BY
ATTORNEY May 8, 1956  L. W. PETERSEN  2,744,570
VAPOR COLLECTING AND FLUID PREHEATING SYSTEM FOR EVAPORATORS
Filed Aug. 11, 1953  2 Sheets-Sheet 2
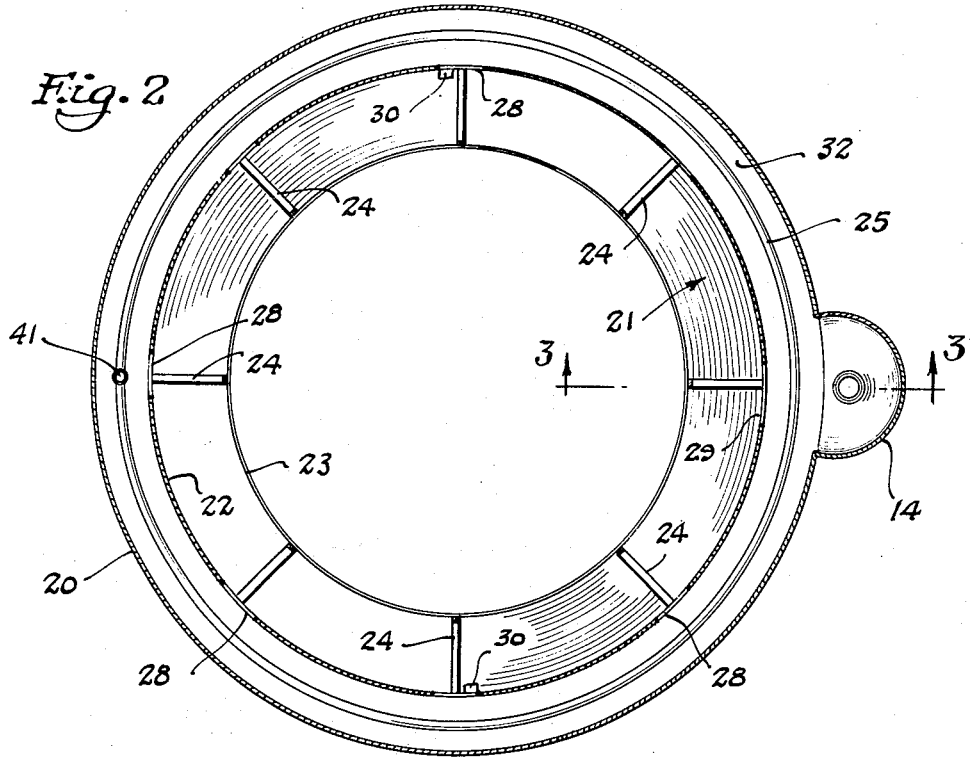
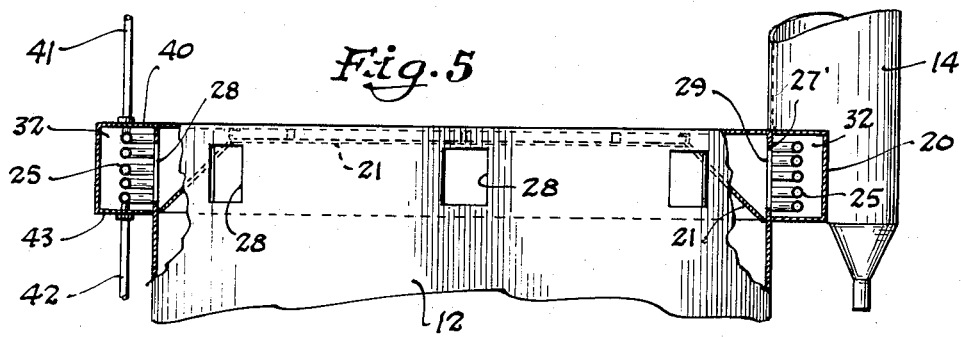
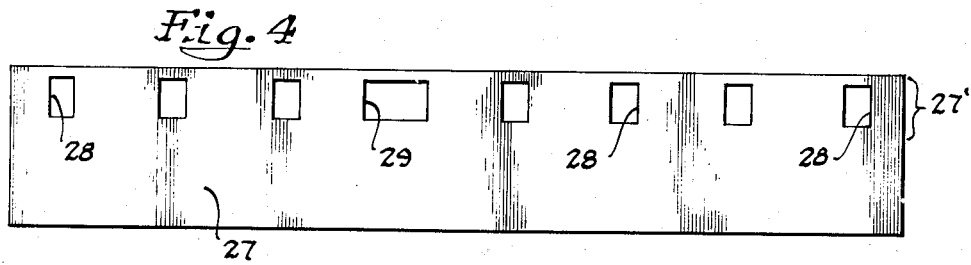
INVENTOR.
Lowell W. Petersen
BY
R. G. Story
ATTORNEY

United States Patent Office 2,744,570
Patented May 8, 1956

2,744,570

VAPOR COLLECTING AND FLUID PREHEATING SYSTEM FOR EVAPORATORS

Lowell W. Petersen, Homewood, Ill., assignor to Swift & Company, Chicago, Ill., a corporation of Illinois Application August 11, 1953, Serial No. 373,570

5 Claims. (Cl. 159—46)

The present invention relates in general to evaporators for the concentration of liquids, and more particularly to a vapor baffle and preheat system adapted for use with an evaporator body.

One of the problems encountered in the evaporation of liquids using the conventional-type evaporator having a liquid-containing body portion and a vapor head space is that of entrainment of liquid in the outgoing vapors from the system. Efforts to relieve the liquid loss resulting from this entrainment have generally required the use of expensive separating equipment wherein the entrained liquid is removed from the vapor. While such efforts have been fairly successful, the types of separators required are generally expensive.

It is therefore an object of the present invention to provide a structure which may be incorporated into any conventional evaporator whereby the loss of liquid due to entrainment from the vapors is minimized.

It is an additional object of the invention to provide a system whereby the velocity of the vapors leaving the vapor head space of an evaporator is reduced prior to the entry of the vapors into the vapor stack.

A further object of this invention is to provide a structure wherein relatively uniform preheating of the liquid entering the evaporator body takes place.

Still a further object of the present invention is to provide a means for extracting a substantial portion of the heat from the vapor leaving an evaporator body.

Additional objects, if not specifically set forth herein, will be readily apparent to one skilled in the art from the following detailed description of the invention:

In the drawings:

Figure 1 represents a front elevation of a conventional evaporator showing the general relation of the vapor collecting and preheating system of the present invention to the rest of the evaporator structure.

Figure 2 is a top sectional view taken on the line 2—2 of Figure 1.

Figure 3 is a partial sectional view on the line 3—3 of Figure 2.

Figure 4 represents a development of the cylindrical vapor head space of the evaporator shown in Figure 1.

Figure 5 is a schematic drawing showing a front elevation of the vapor collection and preheating system of the present invention in such a manner as to illustrate the general relationship of the various components thereof.

Referring now to Figure 1 of the drawings, 10 represents a typical evaporator having a liquid-containing body portion 11 and a vapor head space 12. The usual condensate drain valve 13 and vapor exhaust stack 14 are provided. The vapor collecting and preheating system 15 of the present invention is associated with this conventional structure in the manner shown.

Referring to Figure 2 of the drawings, a top sectional view on the line 2—2 of Figure 1 illustrates generally the conical baffle 21 having a lower annulus 22 of greater diameter than the upper annulus 23 extending substantially about the periphery of the upper portion of the vapor head space of the evaporator. This conical baffle depends from the top of the evaporator and is held in position by means of brackets 24 affixed to the upper end of the side walls of the vapor head space of the evaporator. Surrounding the conical baffle member 21 and defined by side wall 27 and annulus 20 is a chamber 32 which may be designated as the preheat chamber. The lower portion of this preheat chamber is closed off by plate 43 while the upper portion is closed by means of cover plate 40 (see Figures 3 and 5). Positioned within the preheat chamber 32 are a plurality of annular coils 25. As shown in Figure 5 these coils are connected with supply line 41 and discharge line 42.

A detailed view of the internal structure of the vapor collecting and preheating system is shown in Figure 3. The general arrangement of baffle 21 is shown in this drawing together with the supporting brackets 24. It will be noted that a space 31 exists above the edge of baffle 21 permitting passage of vapors rising upwardly through the vapor head space of the evaporator from that portion of the vapor head space below the baffle into that portion of the upper head space above the baffle, and thence into the preheat chamber 32. Liquid which passes over the baffle with the vapor and condenses is permitted to drain back into the body portion of the evaporator via opening 30 at the base of the baffle member. The plurality of preheat coils 25 are clearly illustrated in Figure 3. These coils are held in superposed position in any suitable manner, as by the brackets 44 illustrated. The upper portion of the wall defining the vapor head space of the evaporator has been identified in Figure 3 of the drawings as 27' to facilitate the location of the ports which provide communication with the preheat chamber 32.

Referring now to Figure 4 of the drawings, a development of the cylindrical vapor head space is shown. By comparing the location of 27' on this development with the location of 27' in Figure 3, a clear picture of the manner in which the vapor inlet ducts are arranged is obtained. These ducts 28 are disposed about the periphery of the wall 27' in such a manner that the vapors which pass over baffle 21 enter the preheat chamber 32 in about equal volume around the entire circumference thereof. A larger port 29 is preferably provided in wall 27' at the point where the vapor stack 14 connects to the preheat chamber 32.

Referring now to Figure 5 of the drawings, a schematic illustration of the manner in which the various components of the present invention cooperate is provided. The vapors from the evaporating liquid rise through the vapor head space 12. These vapors contact the inner surface of conical baffle 21 and their velocity is substantially slowed thereby. Some of the liquid entrained with these vapors will condense on the downwardly-inclined inner surface of baffle 21 and be returned by gravity to the body of liquid being concentrated. The hot vapors, relieved of a substantial portion of their entrained liquid content, now pass over the upper surface of baffle 21 as indicated by the arrows on Figure 3 of the drawing and pass via ports 28 and 29 (see Figure 4) through wall 27' and into the preheat chamber 32 disposed laterally about the baffle member 21. The preheat coils 25 disposed within chamber 32 contain the liquid which is subsequently to be evaporated. This liquid is supplied to coils 25 through line 41 from any suitable source (not shown). While within coils 25, this liquid is heated by indirect heat exchange with the hot vapors circulating about said coils. After a substantial portion of heat from these vapors has been thus absorbed by the liquid within coils 25, said liquid is discharged to the evaporator body via outlet 42. The vapors, minus a substantial portion of their heat and carrying very little entrained liquid, then pass out of the system via vapor stack 14. The distribution of the ports 28 about the circumference of the preheat chamber provide, as aforesaid, a uniform distribution of the hot vapors within such preheat chamber. The conical baffle spreads out the area of overflow of the hot vapors around the entire periphery of the evaporator head space, thereby substantially reducing the velocity of the vapors which would ordinarily go out directly at or near the vapor stack only.

The vapor collecting and preheating system of the present invention, while capable of use with any conventional evaporator structure wherein a liquid-containing body portion and vapor head space are provided, is particularly adapted for use with the evaporator shown and described in my copending application S. N. 316,640, filed October 24, 1952, and entitled Submerged Combustion Evaporation.

Obviously, many modifications and variations of the invention as hereinbefore set forth may be made without departing from the spirit and scope thereof, and therefore only such limitations should be imposed as are indicated in the appended claims.

I claim:

1. In combination with an evaporator having a liquid-containing body portion and a vapor head space, a vapor collecting and preheat system comprising: a baffle member disposed within the vapor head space of the evaporator, said baffle member extending substantially about the periphery of the upper portion of said vapor head space; means providing communication about the edges of said baffle member between that portion of the vapor head space above and that portion below said baffle member; a substantially closed chamber disposed laterally around said baffle member; distributing means providing communication between the space above said baffle member and the interior of said chamber; preheat coils disposed within said chamber; said distributing means directing vapor substantially uniformly throughout the interior of said chamber to promote substantially uniform heat exchange between the vapor and the total area of said preheat coils; and means providing communication between said chamber and the exterior of said evaporator.

2. In combination with an evaporator having a liquid-containing body portion and a vapor head space, a vapor collecting and preheat system comprising: a conical baffle member disposed within the vapor head space of the evaporator, the lower annulus of said baffle member extending substantially about the periphery of the upper portion of said vapor head space and being of greater diameter than the upper annulus of said baffle member; means providing communication about the edges of both the upper and lower annulus of said baffle member between that portion of the said vapor space above and that below said baffle member; a substantially closed chamber disposed laterally around said baffle member; vapor distributing means providing communication between the space above said baffle member and the interior of said chamber; preheat coils disposed within said chamber; and means providing communication between said chamber and the exterior of said evaporator.

3. A vapor distributing and preheat system suitable for use in an evaporator having a liquid-containing body portion and a vapor head space, said system including a baffle, said baffle defining an upper and lower vapor space, a preheat area disposed laterally about said upper vapor space, a wall separating said preheat area from said upper vapor space, preheat coils disposed within said preheat area, and vapor distributing means forming a part of said wall to direct the vapor flowing from said upper vapor space into said preheat area into substantially uniform heat exchange relation with the total area of said preheat coils.

4. A vapor distributing and preheat system suitable for use in an evaporator having a liquid-containing body portion and a vapor head space, said system including a baffle, said baffle defining an upper and lower vapor space, a preheat area disposed laterally about said upper vapor space, a wall separating said upper vapor space and said preheat area, preheat coils disposed within said preheat area, and ports in said wall substantially equidistantly spaced along said wall to direct the vapors flowing from said upper vapor space into said preheat area into substantially uniform heat exchange relation with the total area of said preheat coils.

5. A vapor distributing and preheat system suitable for use in an evaporator having a liquid-containing body portion and a vapor head space, said system including a conical baffle, said baffle defining an upper and lower vapor space, the lower annulus of said baffle being of greater diameter than the upper annulus thereof, a preheat chamber disposed laterally about said upper vapor space, said chamber defined by at least two walls, one of said walls being positioned between said chamber and said upper vapor space, preheat coils disposed within said chamber, said wall positioned between said chamber and said upper vapor space having spaced ports therealong, said ports suitable for directing the flow of vapor from said upper vapor space into said chamber into substantially uniform heat exchange relation with the total area of said preheat coils, and means providing communication between said chamber and the exterior thereof.

References Cited in the file of this patent

UNITED STATES PATENTS

| Number | Name | Date |
|---|---|---|
| 66,370 | Matthiessen | July 2, 1867 |
| 511,288 | Chase | Dec. 19, 1893 |
| 661,929 | Duff | Nov. 13, 1900 |
| 828,524 | Warren | Aug. 14, 1906 |
| 863,031 | Lehnert | Aug. 13, 1907 |
| 1,067,010 | Dunn | July 8, 1913 |
| 1,848,197 | Ray et al. | Mar. 8, 1932 |
| 2,223,595 | Blakeslee | Dec. 3, 1940 |